United States Patent [19]

Williames

[11] Patent Number: 4,763,443
[45] Date of Patent: Aug. 16, 1988

[54] CELL CHAINS

[75] Inventor: Geoffrey A. Williames, Warragul, Australia

[73] Assignee: Williames Hi-Tech International Pty. Ltd., Warragul, Australia

[21] Appl. No.: 840,842

[22] Filed: Mar. 18, 1986

[30] Foreign Application Priority Data

Mar. 19, 1985 [AU]  Australia ............................ PG9818
Nov. 6, 1985 [AU]  Australia ............................ PH3301

[51] Int. Cl.⁴ .............................................. A01G 9/10
[52] U.S. Cl. ........................................... 47/86; 111/2; 198/803.14
[58] Field of Search ............. 47/86, 85, 73; 111/2, 111/3; 198/803.14, 803.01; 16/366, 361, 262, 263, 272; 220/23.4; 446/104, 120, 121

[56] References Cited

U.S. PATENT DOCUMENTS

| 1,841,898 | 1/1932 | Lehmun | 16/366 |
| 3,587,829 | 6/1971 | Sorensen | 198/803.01 |
| 3,788,450 | 1/1974 | Tschunt | 198/803.14 |
| 4,132,337 | 1/1979 | Masuda et al. | 47/86 |
| 4,214,403 | 7/1970 | Knudsen | 446/104 |
| 4,357,744 | 11/1982 | McKenzie et al. | 446/121 |

FOREIGN PATENT DOCUMENTS 1207858 12/1966 United Kingdom ................ 47/85

Primary Examiner—Robert E. Bagwill
Assistant Examiner—Bradley Lewis
Attorney, Agent, or Firm—Learman & McCulloch

[57] ABSTRACT

Apparatus for propagation of plant seedlings including a cell chain comprising a series of cells rigidly connected to form a group of aligned cells each group being pivotal relative to its adjacent group by a link cell to form a continuous chain of cells able to be mechanically handled by transport devices or concertined into a solid block of cells having little or no wastage of space.

33 Claims, 3 Drawing Sheets

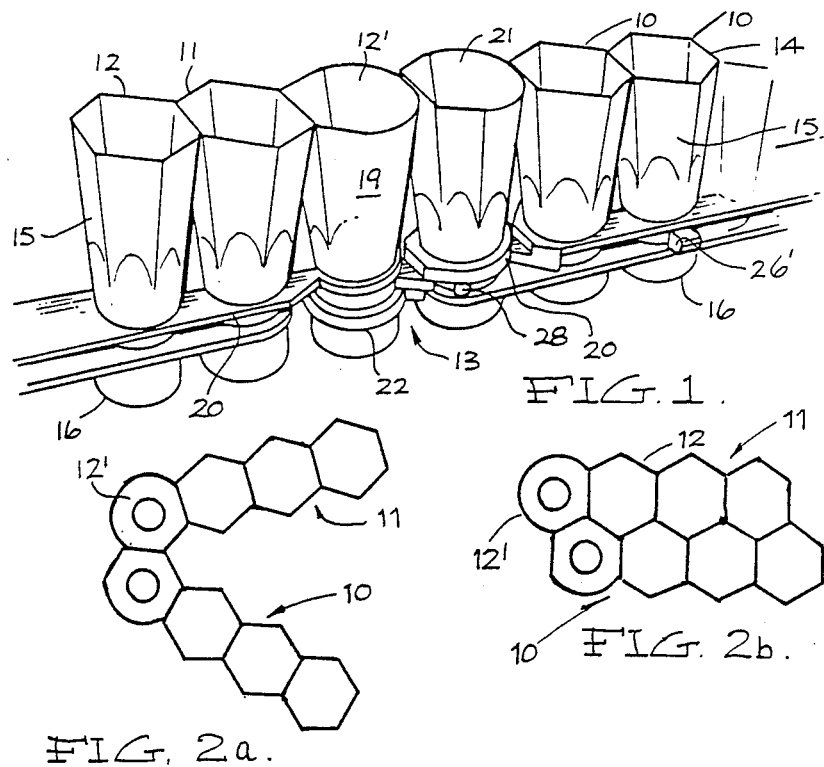
FIG. 1.
FIG. 2a.
FIG. 2b.
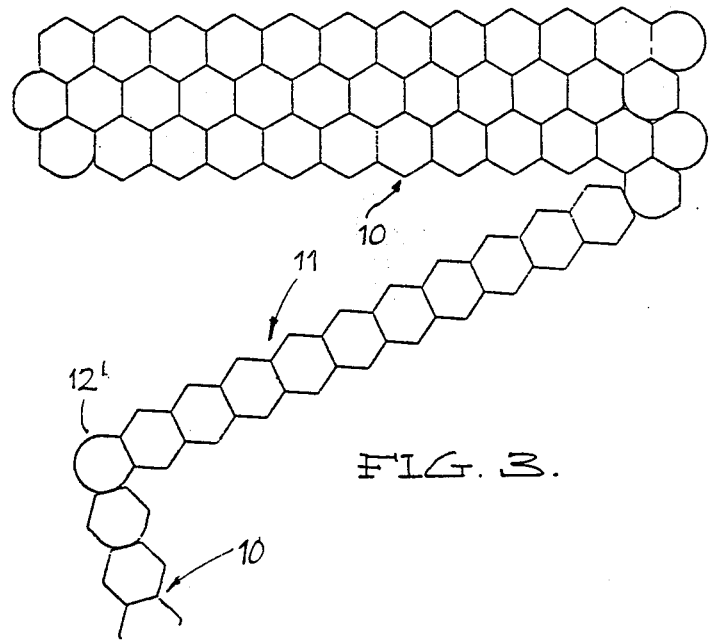
FIG. 3.

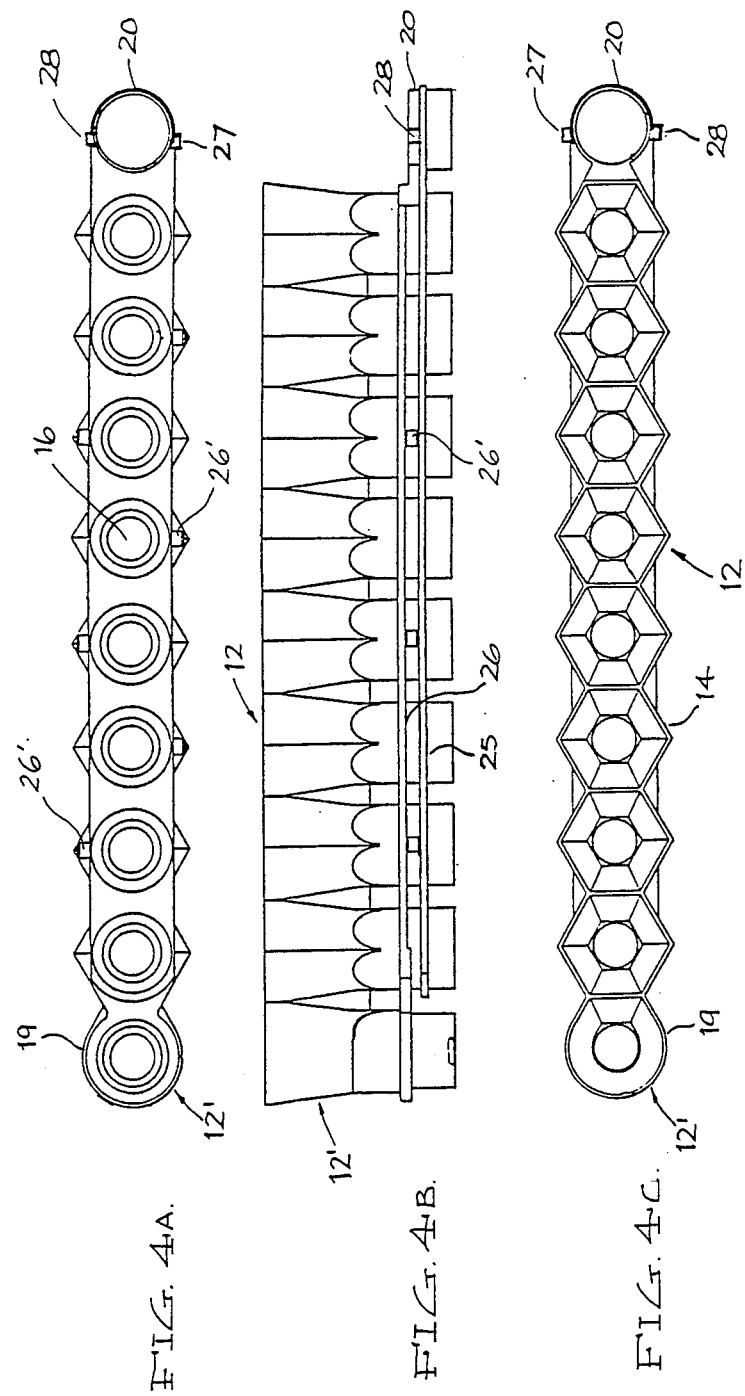

CELL CHAINS

The present invention relates to connected individual cells intended for use in the mechanized propagation of seeds and the handling of plants propagated therein. In particular the invention relates to a cell as described in our Australian patent specification No. 516,117.

These connected individual cells are commonly known as "cell chains". Cell chains are known wherein the cells are each tubular cylindrical constructions of substantially uniform cross-section with pivot connections formed between adjacent cells. These chains are moved between desired locations by drive sprocket wheels engaging essentially between the tubular cells with the open face of the cell directed upwardly to receive propagating material and a seed. While these cell chains are effective in operation they do suffer from certain practical disadvantages. Cell chains of this type because of their pivot arrangements between cells are stored in a circular spiral manner which take up considerable space both between individual cells and by the fact that a circular array of cells leaves substantial areas which cannot be occupied by cells.

The objective of the present invention is to provide a cell chain arrangement which will overcome or substantially minimize the aforementioned disadvantages of known arrangements.

According to a first aspect of the present invention there is provided an arrangement of interconnected individual cells for use in the propagation of seeds, each cell having an open upper face and lower drainage opening, means adapted to receive a propagating medium and at least one seed positioned therein, said arrangement being characterised by a plurality of said individual cells being supported in fixed relationship to one another to form an elongate row or group of cells, and at least two of said groups of cells being hinged together by pivot means to form a cell chain.

Preferably the individual cells in each row of cells are arranged in a straight line and the pivot means is such as to allow groups of cells to lie side by side in storage positions to make up a rectangular array of individual cells. Conveniently the pivot means comprises a double hinge link.

According to a second aspect of the present invention there is provided an arrangement of interconnected individual cells each having an open upper face and lower drainage opening means adapted to receive a propagating medium and at least one seed operatively positioned therein, said arrangement being characterised in that the open upper face of each said cell has a shape adapted to nest with adjacent cells, whereby in a storage position of said cell arrangement adjacent cells are staggered and an open space between adjacent cells is substantially avoided. Conveniently the upper open face of each said cell has a polygonal shape.

In a further aspect of the invention there is provided a cell chain including a plurality of cells for holding seeds or seedlings and propagating medium therein the cells being interconnected by at least one link formed and located in such a way that a tooth of a toothed driving means may interengage the link and/or the cells for moving the cell chain from one point to another.

The cross sectional shape of the cells may vary from circular, hexagonal, square or the like depending upon the desired mode of stacking and use of the invention, and the invention is not limited to any specific cell shape.

The chain can be easily produced from individual units formed as plastics moldings. The cells may be formed with a bottom or alternatively, with inwardly tapered walls to prevent loss of soil therein. The chain may be formed with a point of weakening to facilitate relative pivotal movement of the cells, and ease of breakage if necessary to divide the chain.

The cells may be shaped with hexagonal cross section thereby facilitating close stacking in straight lines.

The cell chain may consist of a series of cells or plant compartments rigidly connected to form rigid groups containing a number of cells. Each group may be pivoted at either end using a coupling link cell which will allow the previous and the following group to pivot about each other. In this way a continuous chain of alternating cell groups and links can be concertined into a solid block of cells to allow ease of handling and storage.

The cell chain may be broken, i.e., separated, at any point where a coupling link cell exists.

The plant cells may vary in shape and size between derivatives of the cell chain. Some possibilities include conical shapes, cylinders and tapered hexagons. Provision can be made between each cell for engagement with a toothed driving means when the chain is straightened into a single strand.

The coupling link cell is uniquely designed to allow the rigid cell groups to hinge in either of two opposite directions but still allow the cells to nest against each other to form a pack of hexagonal cells to appear as a solid sheet of honeycomb.

A unique feature of the construction is that in the packed configuration the cell form a rectangular mass able to maximize the use of space and fit in with standard horticultural practice in existing glass houses. When hinged apart (or straightened) the pack transforms into a single line of hinged cell groups of hexagonal cells, able to be mechanically handled at high speed in single file to select and transplant the soil block (plug) and plant at high speed.

The invention may be better understood from the following description of preferred embodiments given in relation to the accompanying drawings wherein:

FIG. 1 is a fragmentary perspective view of a hinge section between two groups of connected cells of a first preferred embodiment.

FIGS. 2a and 2b are plan views demonstrating schematically the 'wrapping' action of the cell chain to form a solid tray.

FIG. 3 is a schematic plan view of rigid groups of cells forming a concertina.

FIGS. 4A, 4B, and 4C are bottom plan, side elevational, and top plan views, respectively, of a rigid cell chain group.

Figure 5A:
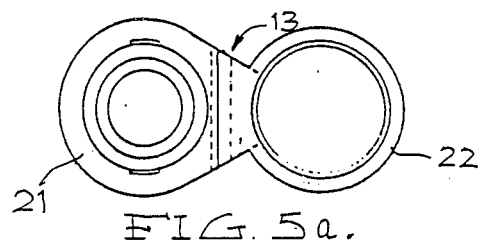
Figure 5:
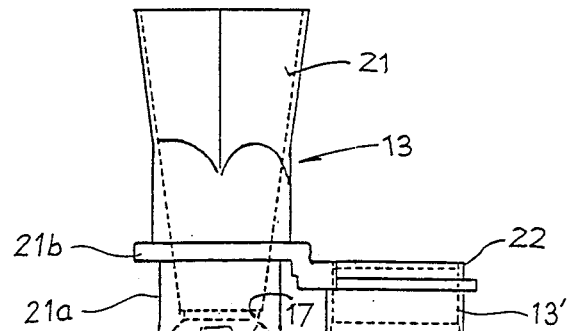
Figure 5B:
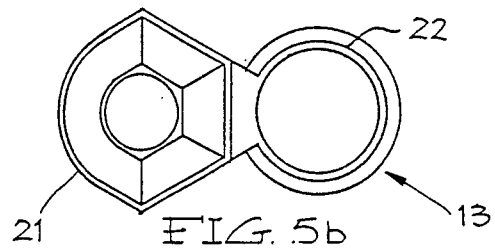

FIGS. 5, 5a and 5b are enlarged bottom plan, side elevational, and top plan views, respectively, of a cell chain link.

Figure 6:
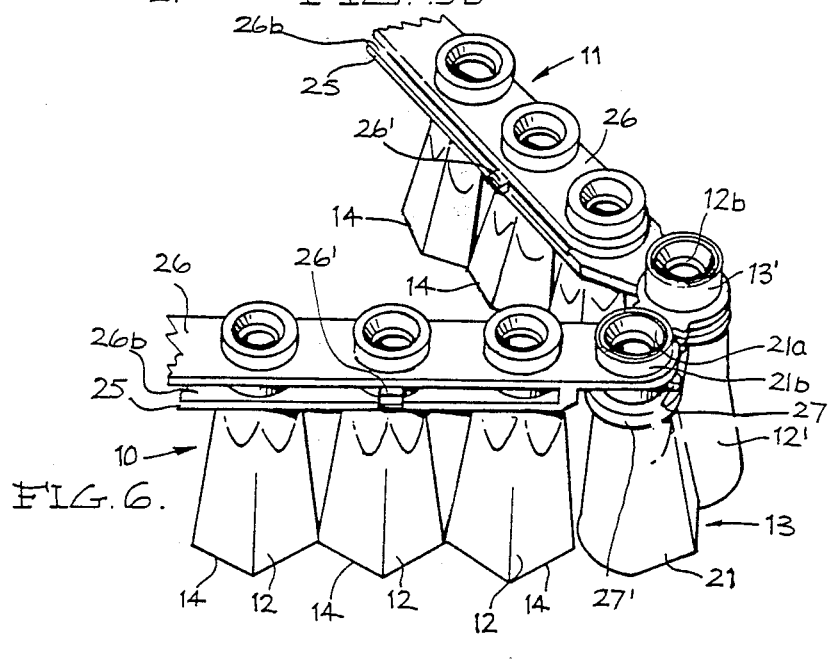

FIG. 6 is a bottom perspective view showing a hinge connection region in greater detail.

Referring to FIGS. 1, and 4A, B and C there is partially shown two groups 10, 11 of rigidly connected individual plant propagation cells 12 connected by a coupling link 13. Each of the cells has a polygonal, preferably regular/hexagonal open upper face 14 with a hollow body 15 tapering downwardly to a drainage opening 16 at the bottom of the cell. The drainage opening 16 comprises a restricted passage 17 together with a widening lower section 18. See FIG. 5.

Each group of cells 10, 11 comprise cells 12 arranged rigidly in line. The number of cells in each group may vary. The endmost or last cell 12' at one end of each group has an arcuate outer face 19 allowing for pivoting movement of the group relative to the adjacent group as will hereinafter be explained. From the endmost cell 21 at the other end of the group projects a hinge collar or retainer 20 enabling the group to be pivotally connected to the coupling link 13.

The coupling link 13 is shown in greater detail in FIGS. 5, 5a and 5b. The coupling link preferably comprises a single propagation cell 21 from which projects an extension terminating at one end in a hinge collar 22 equivalent to the collar 20. The cell 21 has a sleeve at its lower end for rotatable accommodation in the collar 20 and the collar 22 is of such size as rotatably to accommodate the lower, free end of the endmost cell 12'. The collars 20 and 22 thus form a double pivot hinge between the adjacent cell groups 10, 11, thereby enabling each cell group to pivot relative to the coupling link 13 and to each other. The collar 20 has engageable and disengageable stop or limit means 27, 28 projecting transversely from its opposite sides to limit relative pivoting movement while permitting pivoting in each of two opposite directions from the centre line of the rigidly connected cells to a degree sufficient to allow the groups of cells to lie alongside and substantially parallel to one another in a storage position.

As is apparent from the Figures, the individual cells 12 are grouped in separate units and interconnected by a pair of vertically spaced, rigid supports or webs 25, 26. The polygonal upper faces of the cells are so arranged that adjacent groups of cells may nest into one another with substantially no space between adjacent cells. In this manner a substantially rectangular array of cells can be formed in a storage position with minimum wastage of space as is indicated in FIG. 3. There may also be provided lugs or other lateral projections 26' extending from between the rigid supports 25, 26 for accommodation between adjacent supports 25, 26 of a second group of propagation cells when the respective supports are positioned next to one another in a storage position. This arrangement locks the groups together so that in the storage position the upper edges of the faces 14 of the individual cells are all ensured to be located in the same plane. This is best shown in FIGS. 2a, b and 3.

FIG. 6 shows a slightly modified form of the invention comprising a number of rigidly interconnected individual cells 12 having essentially hexagonal upper faces 14 forming rigid groups of in line cells 10 and 11. A coupling link 13 joins the two groups. The coupling link comprises a base section 21a on the endmost cell 21 at one end of the group 10 press fitted but but retained for pivoting movement within a retaining ring 21b fixed at the end of the group 10. The hinge element 13 further includes a ring or collar 13' fixed to and extending laterally from the cell 21 which pivotally accommodates the base section 12b of the endmost cell 12' of the rigid group of cells 11. In this manner, a double hinge connection is formed. A pair of supports or webs 25 and 26 hold the cells 12, 12' together and lateral projections 26' are provided between the webs and extend outwardly beyond the webs for accommodation within the space 26b between the webs when the groups of cells are folded to be nested into one another in side by side relationship. A pair of stop or limit projections 27 (only one of which can be seen in FIG. 6) are provided on a flange section 27' of the rigid element 12. The projections limit the rotation of the hinge element to substantially equal amounts on either side of the centre line of the group of cells 10 and 11. In other respects the embodiment of FIG. 6 is essentially similar to the embodiment illustrated in FIGS. 1 to 5.

In each embodiment the cell 21 of the coupling link 13 occupies the space between the endmost cells of two adjacent groups when the latter extend in prolongation of one another. In this position of the groups the cell 21 abuts the endmost cells of the groups 10 and 11. To ensure free rotation of the two groups the cell 21 has an arcuate wall confronting the endmost cell of the group 10 and the endmost cell of the group 11 has an arcuate wall confronting the cell 21, all of which is best illustrated in FIGS. 1, 2, 5, and 6.

I claim:

1. Apparatus for use in the propagation of plants comprising a plurality of rigid groups of open top, individual cells joined to one another in an elongate row, each of said groups having opposite ends, said groups being arranged in such manner that one end of each group confronts an end of another of said groups; and pivot hinge means pivotally coupling the confronting ends of adjacent groups.

2. Apparatus according to claim 1 wherein said hinge means enables said adjacent ones of said groups to extend in prolongation of one another along a straight line.

3. Apparatus according to claim 1 wherein said hinge means enables one of said groups to pivot relative to an adjacent one of said groups in at least one direction through an arc of such length as to locate said one and said adjacent groups in substantially parallel, side-by-side relation.

4. Apparatus according to claim 1 wherein the cells of said groups are staggered when said groups are pivoted to extend alongside and substantially parallel to one another.

5. Apparatus according to claim 1 wherein said hinge means enables one of said groups to pivot relative to an adjacent one of said groups in either of two opposite directions to locate said one and said adjacent groups in substantially parallel, side-by-side relation.

6. Apparatus according to claim 1 wherein said hinge means includes limit means for limiting relative pivotal movement of said adjacent groups.

7. Apparatus according to claim 1 wherein each of said units has an endmost cell formed with an arcuate external surface.

8. Apparatus according to claim 7 wherein said endmost cell is at one end only of the associated group.

9. Apparatus according to claim 1 wherein said hinge means comprises a collar in which the lower end of an endmost one of said cells is rotatably accommodated.

10. Apparatus according to claim 1 wherein said hinge means comprises a collar carried by and projecting from one end of one of said groups and a cell having its lower end rotatably accommodated in said collar.

11. Apparatus according to claim 10 wherein said hinge means comprises a second collar in which the lower end of the endmost cell of an adjacent group is rotatably accommodated.

12. Apparatus for use in propagating plants comprising a plurality of substantially uniform, open top cells extending in an elongate row; rigid means supporting said cells in a group; first hinge means carried at one end of said group; and second hinge means carried at the opposite end of said group, the first hinge means at said one end being engageable with the second hinge means at the opposite end of a second, like group to pivotally couple the first and second groups together in chain form.

13. Apparatus according to claim 12 wherein said first hinge means comprises a collar extending beyond one end of said first group.

14. Apparatus according to claim 13 wherein said second hinge means comprises a cell extending beyond the opposite end of said first support and having a sleeve at its lower end of such size as rotatably to be accommodated in said collar.

15. Apparatus for use in propagating plants comprising a first plurality of rigid, open top cells; means rigidly joining the cells of said first plurality to one another to form a first rigid group of cells extending in an elongate row; a second plurality of rigid, open top cells; means rigidly joining the cells of said second plurality to one another to form a second rigid group of cells extending in an elongate row; first hinge means at corresponding ends of each of said groups; and second hinge means at the other end of each of said groups, the first hinge means at one end of said first group being coupled to the second hinge means at the other end of said second group and joining said groups to one another in chain form for relative pivotal movement therebetween.

16. Apparatus according to claim 15 wherein said coupled first and second hinge means permit relative pivotal movement of said groups through an arc of such length as to enable said groups to be moved from a first position in which the respective rows of cells extend in prolongation of one another to a second position in which they lie alongside one another.

17. Apparatus according to claim 16 in which said coupled first and second hinge means enable relative pivotal movement of said groups in each of two opposite directions from said first position to said second position.

18. Apparatus according to claim 15 wherein one of said hinge means comprises a collar extending beyond one end of each of said groups and the other of said hinge means comprises a sleeve carried by the endmost cell at the opposite end of each of said groups, said collar being of such size as rotatably to accommodate said sleeve.

19. Apparatus according to claim 15 including limit means carried by one of said hinge means in a position to engage the other of said hinge means.

20. Apparatus for use in propagating plants comprising a plurality of substantially uniform, open top cells; means joining said cells one to another to form an elongate, rigid group thereof; retainer means carried by and extending beyond the endmost cell at one end of said group for a distance corresponding substantially to the length of one of said cells; and coupling means rotatably carried by said retainer means for pivotally coupling said group in chain form to a corresponding group, said coupling means including an open top cell corresponding in size substantially to that of the cells forming said group.

21. Apparatus according to claim 20 wherein the endmost cell at the opposite end of said group has a free lower end, and wherein said coupling means rotatably may accommodate said free lower end.

22. Apparatus according to claim 21 wherein said coupling means includes an extension having a collar for receiving said lower end.

23. Apparatus according to claim 22 wherein the cell of said coupling means has an arcuate external surface confronting the adjacent cell at said end of said group.

24. Apparatus according to claim 22 wherein said endmost cell has an arcuate external surface.

25. Apparatus for use in propagating plants comprising at least two rigid groups of interconnected, individual cells, the cells of each of said groups being arranged in an elongate row and each of said cells having an upper, open end; coupling link means; means pivotally connecting one end of said link means to one end of one of said groups; and means pivotally connecting said link means at its other end to one end of the other of said groups, whereby said groups are linked together in chain form and each of said groups is pivotal relative to said link means and to the other of said groups.

26. Apparatus according to claim 25 wherein said link means is of such length as to enable said groups to move from a first position in which the cells of said groups extend in prolongation of one another along a straight line to a second position in which the cells of said groups lie alongside and substantially parallel to one another.

27. Apparatus according to claim 26 wherein said link means and one of said groups have engageable and disengageable limit means for limiting relative pivotal movement of said link means and said one of said groups.

28. Apparatus according to claim 26 wherein the length of said link means enables the cells of said groups to be staggered when said groups are in said second position.

29. Apparatus according to claim 25 including an open top cell carried by said link means at one end thereof and being of a size corresponding substantially to that of the cells of said groups.

30. Apparatus according to claim 29 wherein said connecting means comprises a collar at one end of each of said groups, the cell carried by said link means being of such size as rotatably to be accommodated in said collar.

31. Apparatus according to claim 29 wherein said link means has a collar at its opposite end, and wherein said connecting means comprises a sleeve at the lower end of an endmost cell at the opposite end of each of said groups, said sleeve being of such size as rotatably to be accommodated in said collar of said link means.

32. Apparatus according to claim 25 wherein the cells of each of said groups are interconnected by a rigid web.

33. Apparatus for the propagation of plants comprising a plurality of rigid groups of interconnected, individual, open top cells arranged in a row, each of said cells being of substantially uniform height, the upper edges of said cells being substantially coplanar; means coupling adjacent ones of said groups to one another for pivotal movement from a first position in which such adjacent groups extend in prolonga-tion of one another to a second position in which said groups lie alongside and adjacent one another; and means extending laterally from one of said groups for accommodation in spaces in an adjacent one of said groups when said groups are in said second position to maintain the upper edges of the cells of adjacent groups substantially coplanar.

* * * * *

UNITED STATES PATENT AND TRADEMARK OFFICE
CERTIFICATE OF CORRECTION

PATENT NO.   :   4,763,443
DATED        :   August 16, 1988
INVENTOR(S)  :   Geoffrey F. Williames, Warragul, Australia It is certified that error appears in the above-identified patent and that said Letters Patent is hereby corrected as shown below:

Column 4, line 50, change "units" to -- groups --

Column 5, line 12, change "support" to -- group --

Signed and Sealed this

Tenth Day of January, 1989

*Attest:*

DONALD J. QUIGG

*Attesting Officer*   Commissioner of Patents and Trademarks